(12) United States Patent
Ueoka et al.

(10) Patent No.: US 9,015,526 B2
(45) Date of Patent: Apr. 21, 2015

(54) RESTORING METHOD AND COMPUTER SYSTEM

(71) Applicant: Hitachi, Ltd., Tokyo (JP)

(72) Inventors: Atsushi Ueoka, Machida (JP); Takaki Nakamura, Ebina (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 241 days.

(21) Appl. No.: 13/641,803

(22) PCT Filed: Oct. 5, 2012

(86) PCT No.: PCT/JP2012/006410
§ 371 (c)(1),
(2) Date: Nov. 12, 2012

(87) PCT Pub. No.: WO2014/054078
PCT Pub. Date: Apr. 10, 2014

(65) Prior Publication Data
US 2014/0129524 A1    May 8, 2014

(51) Int. Cl.
*G06F 11/14* (2006.01)
(52) U.S. Cl.
CPC ........ *G06F 11/1469* (2013.01); *G06F 2201/82* (2013.01); *G06F 2201/84* (2013.01)
(58) Field of Classification Search
CPC ...................... G06F 11/1435; G06F 11/1469
USPC ........................ 714/15; 707/999.2, 999.204
See application file for complete search history.

(56) References Cited

U.S. PATENT DOCUMENTS

| 7,437,603 | B2 | 10/2008 | Ebata et al. |
| 7,454,445 | B2 * | 11/2008 | Lewis et al. ........................... 1/1 |
| 7,523,276 | B1 | 4/2009 | Shankar |
| 7,930,275 | B2 * | 4/2011 | Chen et al. .................... 707/674 |
| 2003/0140070 | A1 * | 7/2003 | Kaczmarski et al. ......... 707/204 |
| 2004/0117572 | A1 | 6/2004 | Welsh et al. |
| 2004/0205312 | A1 | 10/2004 | Zlotnick et al. |
| 2004/0267835 | A1 * | 12/2004 | Zwilling et al. .............. 707/202 |
| 2007/0083567 | A1 * | 4/2007 | Arai et al. ..................... 707/200 |
| 2009/0210462 | A1 | 8/2009 | Arakawa et al. |
| 2010/0049754 | A1 | 2/2010 | Takaoka et al. |
| 2011/0119234 | A1 * | 5/2011 | Schack et al. ................. 707/639 |
| 2012/0084523 | A1 * | 4/2012 | Littlefield et al. ............ 711/162 |

FOREIGN PATENT DOCUMENTS

| JP | 2010-049488 A | 3/2010 |
| JP | 4809040 B2 | 8/2011 |

* cited by examiner

*Primary Examiner* — Yolanda L Wilson
(74) *Attorney, Agent, or Firm* — Volpe and Koenig, P.C.

(57) ABSTRACT

A NAS device providing a snapshot function for executing CoW processing in multiple successive block units is provided, wherein upon restoring a file saved in a file system sharing from a snapshot, the speed for restoring files is enhanced by restoring only data blocks that have been changed within the data blocks constituting a file, to thereby reduce the amount of data being restored and cut down CoW processing. Upon restoring a file stored in file system sharing from a snapshot file, data blocks storing different data between the restore source file and the restore destination file are specified based on a differential map table and a differential block table, and only the specified data blocks are restored. Further, upon restoring data from a file other than the snapshot, the data blocks constituting the restore source file and the restore destination file are compared, and only the data blocks storing different data are restored.

6 Claims, 9 Drawing Sheets

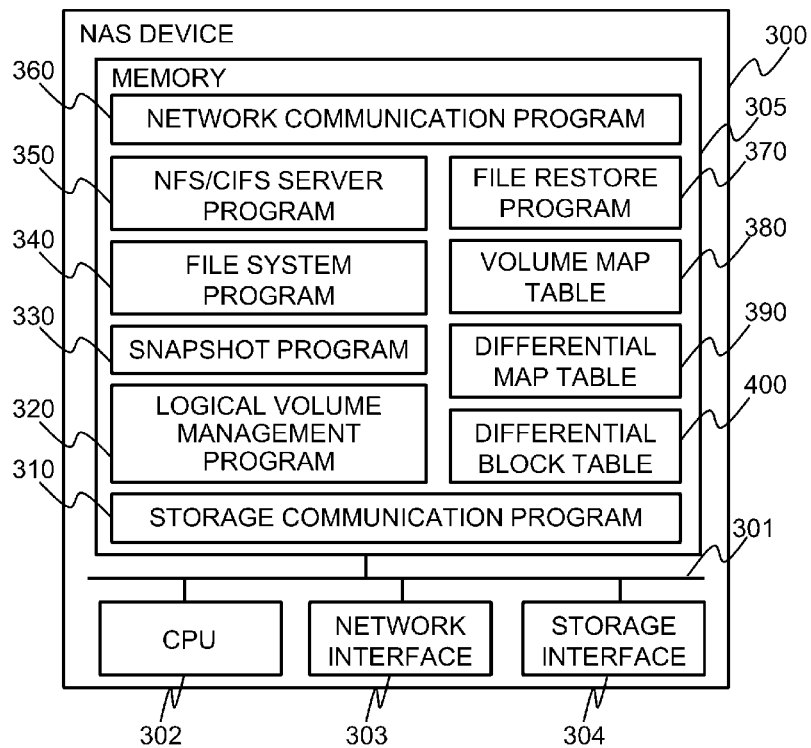

RESTORING METHOD AND COMPUTER SYSTEM

TECHNICAL FIELD

The present invention relates to a method for faster restoring a file from a snapshot of a file saved in a NAS device, and a restore processing device used for the same.

BACKGROUND ART

A NAS (Network Attached Storage) device is provided for enabling file system sharing that can be accessed via an NFS (Network File System) protocol or a CIFS (Common Internet File System) protocol from a plurality of computers via a network. One of the means for protecting data saved in the NAS device is a CoW (Copy on Write) type snapshot (hereinafter referred to as "CoW snapshot"). According to the CoW snapshot, when a write request to the file system is received, the block data of the write destination is saved to a volume (hereinafter referred to as "differential volume") that differs from the volume constituting the file system (hereinafter referred to as "primary volume"), and the data of the write request is overwritten to the block data of the primary volume. In a CoW snapshot, a virtual volume composed by combining the block data saved to the differential volume and the block data not overwritten in the primary volume is provided as a snapshot file system. In a CoW snapshot, in order to constitute a virtual volume corresponding to the snapshot, identification information such as an address of the data blocks within the differential volume of the data blocks saved during the CoW processing is saved as management information for each snapshot generation.

Generally, in order to restore a file stored in a file system from a CoW snapshot, the file in the file system is overwritten by the file in the snapshot. Actually, the file in the snapshot is copied to overwrite the file in the file system being the target of the restore processing using a function (a command or the like) to copy files provided by the OS or the like of various computers (such as the NAS client) using the NAS device. According to this restore method, all the blocks constituting the restore target file will be overwritten. Therefore, even the data blocks of the primary volume not saved in the differential volume will also be overwritten by the data blocks in the primary volume, so that unnecessary CoW processing occurs. Further, since the differential volume is consumed uselessly, the process is inefficient.

Methods for efficiently restoring file systems and files from a CoW snapshot are taught in patent literatures 1 and 2. According to these patent literatures, Cow processing is performed in block units, and based on the identification information of saved data blocks taught in the aforementioned management information, the block data saved to the exterior via CoW processing are specified and overwritten to the file system, according to which the file system and the files are restored to the state of a specific snapshot generation. Thus, it becomes unnecessary to restore the whole file system or the whole file, so that efficient restore processing can be executed.

CITATION LIST

Patent Literature

PTL 1: Japanese Patent No. 4809040 (U.S. Pat. No. 7,437,603)

PTL 2: Japanese Patent Application Publication No. 2010-49488 (United States Patent Application Publication No. 2010/0049754)

SUMMARY OF INVENTION

Technical Problem

A method is provided for saving data in a unit having gathered a plurality of successive blocks into a single unit (hereinafter, this unit is referred to as "chunk") in a CoW snapshot for enhancing the efficiency of CoW processing. In this case, the above management information stores, for example, the addresses of saved chunks in the differential volume. The saved chunks may include data blocks of multiple files. For example, the data blocks of file A and the data blocks of file B may be included in a single chunk. The above-described prior art assumes that the data saved via CoW processing is in units of blocks, which are the minimum input and output size of a file system, and the data is restored in saved data units. Therefore, when file-unit data is restored from the CoW snapshot saved in chunk units, the whole of the saved chunk must be restored, according to which unintended blocks are restored, and the consistency of files outside the restore target cannot be guaranteed. Therefore, in order to restore files from a snapshot subjected to CoW processing in chunk units, as mentioned earlier, the files in the snapshot must be copied to the files in the file system being the target of the restore processing, according to which the process will be inefficient. Especially in a large-capacity file in which the file size exceeds tens of GB, the restore time is elongated and a large amount of differential volume will be consumed.

Solution to Problem

In order to solve the above problems, the present invention provides a method for restoring a file stored in a file system sharing from a snapshot file corresponding to the file system sharing, wherein the data blocks storing different data between the restore source file and the restore destination file are specified, and only the specified data blocks are restored.

Advantageous Effects of Invention

According to the present invention, upon restoring a file, the data blocks that must be restored is suppressed to a minimum, so that the restore processing can be performed at high speed even if the target file has a large capacity, and the restore time can be shortened significantly. Furthermore, upon performing the restore processing from a most recent snapshot, there is no need to perform CoW processing, so that the restore processing can be performed at high speed and the consumption of the differential volume can be suppressed.

BRIEF DESCRIPTION OF DRAWINGS

FIG. 3 is a simplified view showing the configuration of a NAS device realizing the method for faster restoring a file according to the present invention.

FIG. 4 is a view showing one example of a volume map table.

DESCRIPTION OF EMBODIMENTS

Figure 1:
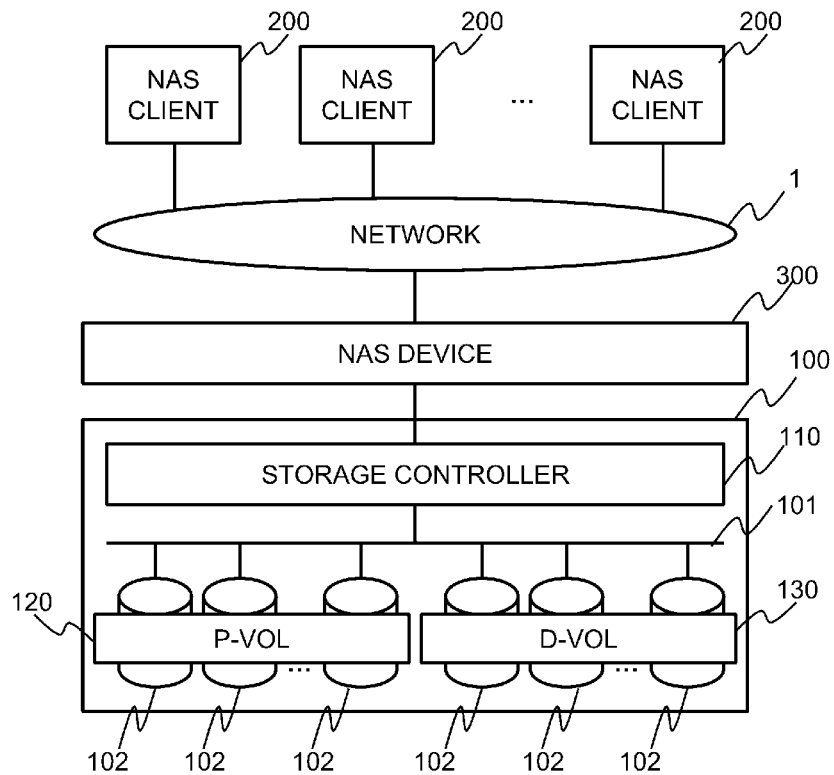
FIG. 1 is a simplified view showing a system configuration to which the method for faster restoring a file according to the present invention is applied.

The preferred embodiments of the present invention will be described with reference to FIGS. 1 through 14. FIG. 1 is a view showing a simplified view of the system configuration to which the present invention is applied. As illustrated, the system according to the present embodiment is composed of at least a single NAS device 300, a storage system 100 connected to the NAS device 300, and at least a single NAS client 200 utilizing the NAS device 300 through the network 1.

The storage system 100 includes hard disks 102 constituting one or more primary volumes 120 which are logical volumes that the NAS device 300 provides as file system sharing and one or more differential volumes (D-VOL) 130 which are logical volumes being the data save destination in a CoW processing when data is written to the primary volume (P-VOL) 120, a storage controller 110 for controlling accesses from the NAS device 300 to the logical volumes, and an internal bus 101 connecting the same.

Figure 2:
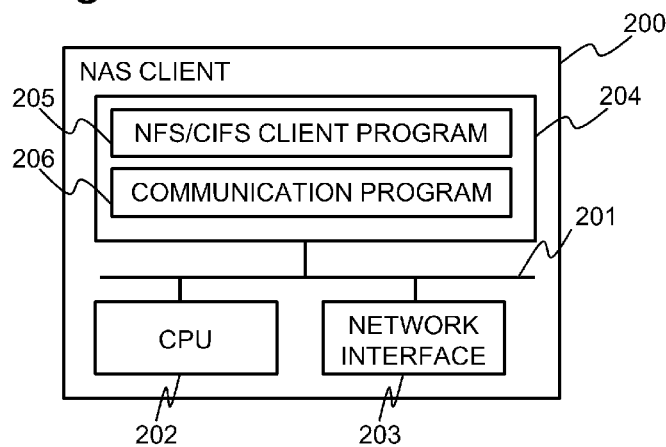
FIG. 2 is a simplified view showing the configuration of a NAS client.

FIG. 2 is a simplified view showing the configuration of the NAS client 200. As shown, the NAS client 200 includes a CPU 202, a network interface 203 for allowing connection to the network 1, and an internal bus 201 for connecting the same to the memory 204.

The memory 204 stores an NFS/CIFS client program 205 for accessing the file system sharing provided by the NAS device 300 via an NFS or CIFS protocol, and a network communication control program 206 for performing communication using the communication protocol of the network 1 via a network interface 203. The CPU 202 executes these programs. Although not shown, the memory 204 stores an operating system.

FIG. 3 shows a simplified view of the configuration of the NAS device 300. As illustrated, the NAS device 300 includes a CPU 302, a network interface 303 for connecting to the network 1, a storage interface 304 for connecting to the storage system 100, a memory 305, and an internal bus 301 for connecting components 302 through 305.

The memory 305 stores a storage communication control program 310 for performing communication processing with the storage system 100 via the storage interface 304, a logical volume management program 320 for controlling the writing and reading processes of the logical volume provided by the storage system 100, a snapshot program 330 for executing a CoW snapshot processing, a file system program 340 for controlling the logical volume provided by the storage system 100 as a file system, a NFS/CIFS server program 350 for controlling accesses via NFS/CIFS protocol from the NAS client 200 to the file system sharing provided by the NAS device 300, a network communication control program 360 for performing communication processing with the NAS client 200 via the network interface 303, and a file restore program 370 for realizing faster restoration of files. The CPU 302 executes these programs. Further, the memory 305 stores a volume map table 380 for storing the relationship between the logical volumes and file systems, a differential map table 390 storing the chunks saved to the differential volume via the CoW snapshot for each virtual volume corresponding to the snapshot of each generation, and a differential block table 400 for entering blocks in which change has occurred in a chunk of the primary volume corresponding to the chunk saved to the differential volume 130.

FIG. 4 is a view showing one example of the volume map table 380 for entering the relationship between the logical volumes and the file systems. The volume map table 380 includes a field 381 for entering a file system name, a field 382 for entering a logical volume name provided as a file system shown in the field 381, a field 383 for showing whether the logical volume shown in the field 382 is a primary volume 120 or a virtual volume, a field 384 for entering a differential volume name being the data save destination of the logical volume indicated in the filed 382 if the field 383 indicates a primary volume 120, and a field 385 for entering the primary volume 120 corresponding to the logical volume (snapshot) shown in the field 382 if the field 383 is a virtual volume, that is, a snapshot volume. If the value entered in the field 383 is "P", it means that the volume is a primary volume, and if the value is "V", it means that the volume is a virtual volume.

For example, it can be seen from the entry in which the value in the field 381 is "FS1" that the logical volume "P-VOL1" provided as file system "FS1" is the primary volume 120, and that the differential volume 130 for saving differential data is "D-VOL1". Further, based on the entry in which the value of the filed 381 is "SS1", it can be seen that the logical volume "V-VOL1" provided as file system "SS1" is a virtual volume, and that it is a snapshot of the primary volume 120 "P-VOL1".

Figure 5:
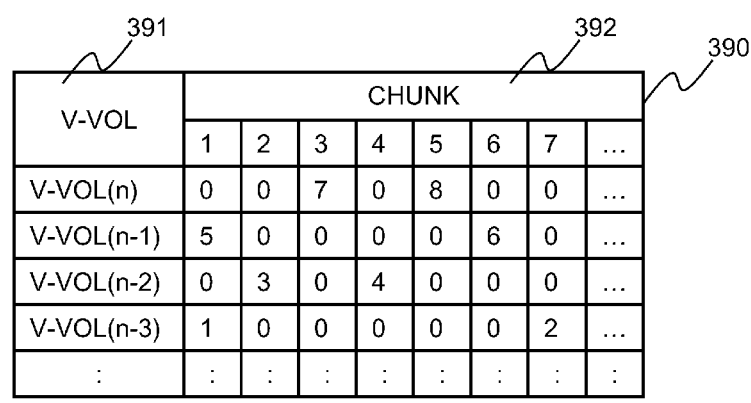
FIG. 5 is a view showing one example of a differential map table.

FIG. 5 shows one example of a differential map table 390 for entering the information on the chunk saved to the differential volume via CoW processing for each snapshot generation. As illustrated, the differential map table 390 includes a field 391 for entering the virtual volume name corresponding to the snapshot, and a field 392 showing the information for identifying a chuck which is a collection of data blocks constituting the virtual volume. The entry of the present table is entered when a snapshot is created. In the example of FIG. 5, a new entry is entered to the top column of the table. The field 392 stores "0" or the chuck number of the differential volume 130. When the entry is most recent, if the field 392 is "0", it shows that the same chunk data in the primary volume 120 should be used, and if the generation is not the most recent generation, the value will be the same as the value of the entry of the virtual volume corresponding to the snapshot of the generation newer than that generation.

The entering of information to the differential map table 390 is performed by the snapshot program 330. The details of the entering process will be illustrated later. Further, the snapshot program 330 creates a virtual volume based on the information entered to the differential map table 390, and provides the same as a snapshot.

For example, the entry in which the value of field 391 is "V-VOL (n)" is the information of the virtual volume corresponding to the most recent snapshot, wherein chunks 1, 2, 4, 6 and 7 correspond to the data of chunks 1, 2, 4, 6 and 7 of the primary volume 120, and chunks 3 and 5 create a virtual volume composed of data of chunks 7 and 8 of the differential volume 130, and the same is provided as a snapshot.

Further, the entry in which the value of the field 391 is "V-VOL (n−2)" has the value "0" set to chunks 1, 3, 5, 6 and 7, so that the chunks 1, 3, 5, 6 and 7 of entries of "V-VOL (n−1)" are referred to. Since the values of chunks 1, 3, 5, 6 and 7 of entries of "V-VOL (n−1)" are "5", "0", "0", "6" and "0", respectively, the chunks 3, 5 and 7 refers to the values of chunks 3, 5 and 7 of the entries in which the value of field 391 is "V-VOL (n)". The values of chunks 3, 5 and 7 of the entries in which the value of field 391 is "V-VOL (n)" are "7", "8" and "0", respectively. Here, "V-VOL (n)" is the most recent snapshot, so that further processes are unnecessary. Based on these results, the values of chunks 1, 2, 3, 4, 5, 6 and 7 constituting the virtual volume "V-VOL (n−2)" are "5", "3", "7", "4", "8", "6" and "0", respectively. Therefore, the snapshot program 330 creates a virtual volume in which chunks 1, 2, 3, 4, 5 and 6 are composed of data of "5", "3", "7", "4", "8" and "6" of the differential volume 130, and in which chunk 7 is composed of the data of chunk 7 in the primary volume 120, and the same is provided as a snapshot.

Figure 6:
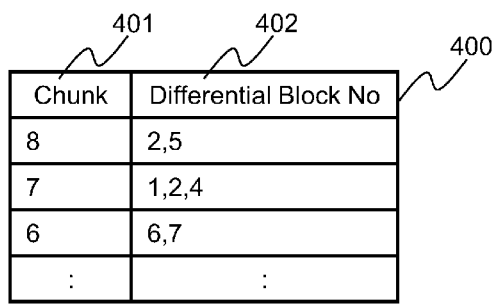
FIG. 6 is a view showing one example of a differential block table.

FIG. 6 shows an example of a differential block table 400 for entering the information related to the updated data blocks included in the chunks saved in the differential volume 130. As shown, the differential block table 400 comprises a field 401 showing the chunks saved in the differential volume 130, and a field 402 showing the data blocks updated by the chunk of the primary volume 120 corresponding to the relevant chunk out of the data blocks constituting the chunk shown in the field 401.

For example, based on the entry in which the value of field 401 is "8", it can be seen that at the point of time in which the snapshot including the relevant chunk was most recent, the data blocks "2" and "5" out of the data blocks of chunk 8 of the differential volume 130 were updated by the chunk of the primary volume 120 corresponding to the relevant chunk.

Figure 7:
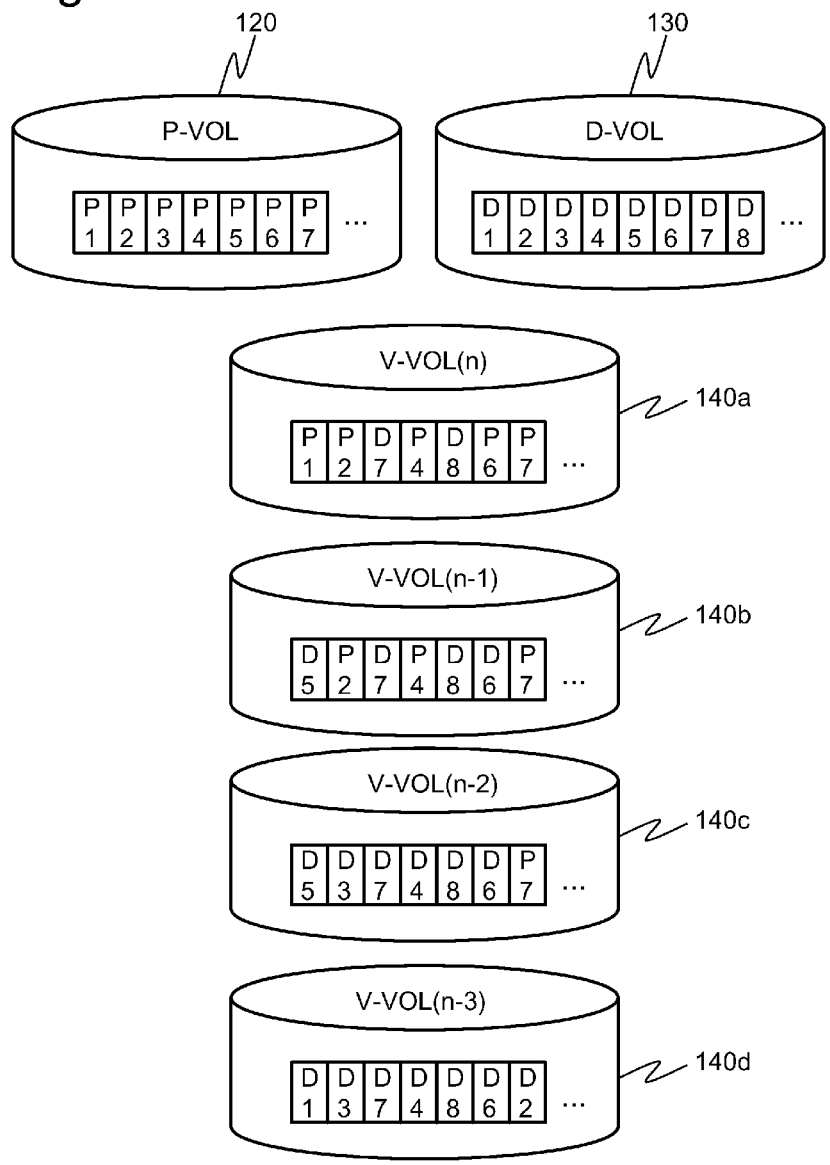
FIG. 7 is a simplified view showing one example of the relationship between the primary volume, the differential volume and the virtual volume.

Next, the relationship between the primary volume 120, the differential volume 130 and the virtual volume 140 will be described. FIG. 7 is a view showing the relationship between the primary volume 120, the differential volume 130 and the virtual volume 140 based on the example of FIG. 5. In FIG. 7, the chunks of the primary volume 120 are referred to as "P1", "P2", "P3", "P4", "P5", "P6" and "P7", and the chunks saved in the differential volume 130 are referred to as "D1" "D2", "D3", "D4", "D5", "D6", "D7" and "D8". Furthermore, reference numbers 140a, 140b, 140c and 140d in the drawing refer to the respective virtual volumes "V-VOL (n)", "V-VOL (n−1)", "V-VOL (n−2)" and "V-VOL (n−3)" in the named order. By referring to FIG. 5, regarding the virtual volume "V-VOL (n)", the chunks 1, 2, 4, 6 and 7 are composed of data of chunks 1, 2, 4, 6 and 7 of the primary volume 120, and chunks 3 and 5 are composed of data of chunks 7 and 8 of the differential volume 130. Therefore, the virtual volume "V-VOL (n)" of reference number 140a is composed of chunks of "P1", "P2", "D7", "P4", "D8", "P6" and "P7". Similarly, as mentioned earlier, regarding the virtual volume "V-VOL (n−2)", the chunks 1, 2, 3, 4, 5 and 6 are composed of chunks 5, 3, 7, 4, 8 and 6 of the differential volume 130, and the chunk 7 is the chunk 7 of the primary volume. Therefore, the virtual volume "V-VOL (n−2)" of reference number 140c is composed of chunks of "D5", "D3", "D7", "D4", "D8", "D6" and "P7".

Figure 8:
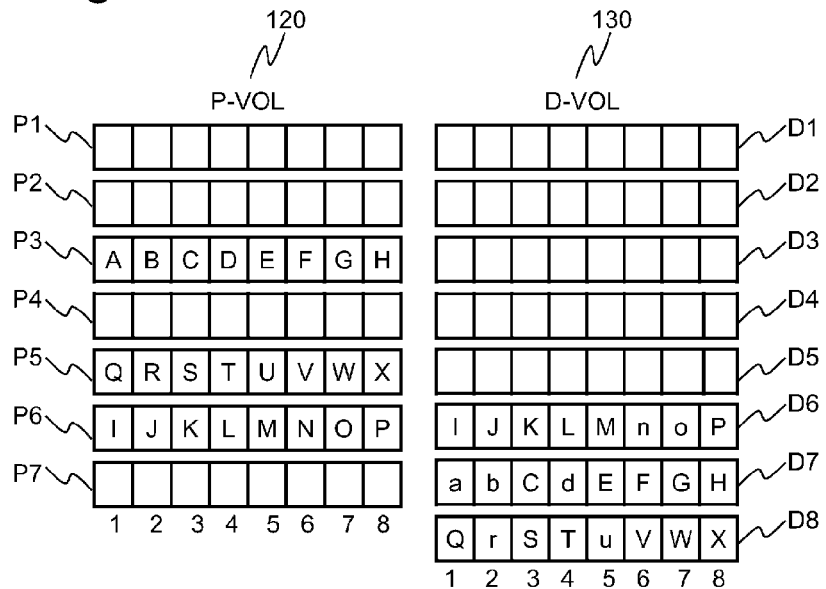
FIG. 8 is a simplified view showing the relationship between the chunks and blocks of the primary volume and the differential volume.

Next, the relationship between the chunks and data blocks of the primary volume 120 and the differential volume 130 will be described. FIG. 8 illustrates one example of the relationship between the chunks and data blocks of the primary volume 120 and the differential volume 130 based on the examples of FIGS. 5 and 6. In the example of FIG. 8, eight successive data blocks are handled as a single chunk. Chunks "P1" through "P7" out of all chunks within the primary volume 120 are illustrated, and chunks "D1" through "D8" out of all chunks within the differential volume 130 are illustrated.

For example, according to the first entry of FIG. 5, it can be seen that the chunk "P3" of the primary volume 120 is saved in chunk "D7" of the differential volume. Further, from FIG. 6, it can be seen that the chunk "D7" of the differential volume 120 has first, second and fourth data blocks that differ from chunk "P3" of the primary volume. In FIG. 8, the value of all blocks constituting chunk "P3" of the primary volume 120 is "ABCDEFGH", and the value of all blocks constituting "D7" which is the chunk in the differential volume 130 saving the relevant chunk is "abCdEFGH", according to which the first, second and fourth blocks differ. As illustrated, based on the differential map table 390 and the differential block table 400, it is possible to specify the chunks saved from the primary volume 120 to the differential volume 130 and the blocks having been changed.

Next, the relationship between the block data constituting the files in the file system of the primary volume 120 and the block data constituting the files in the snapshot of the virtual volume 140 is illustrated with reference to FIG. 9.

Figure 9:
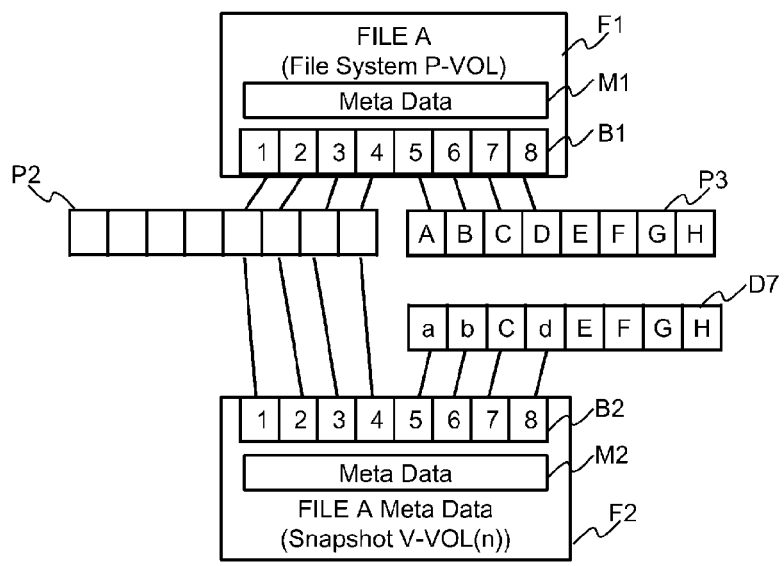
FIG. 9 is a simplified view showing one example of the relationship between the files in the file system and the files in the snapshot.

In FIG. 9, a file A (reference number F1) in the file system of primary volume 120 and a file A (reference number F2) in the snapshot of the virtual volume 140a are illustrated. As illustrated, the files F1 and F2 are composed of metadata M1 and M2 storing file name, file size, creation date and time, update date and time etc., and lists of data blocks B1 and B2 storing the actual data. The data of files F1 and F2 are composed in the order in the lists of data block lists B1 and B2.

The file F1 is composed of four lower blocks of chunk "P2" of the primary volume 120 and four upper blocks of chunk P3. Further, file F2 is composed of four lower blocks of chunk "P2" of the primary volume and four upper blocks of chunk "D7" of the differential volume 130. Now, it can be seen that the fifth, sixth and eighth blocks constituting the respective files differ among file F1 and file F2.

Figure 10:
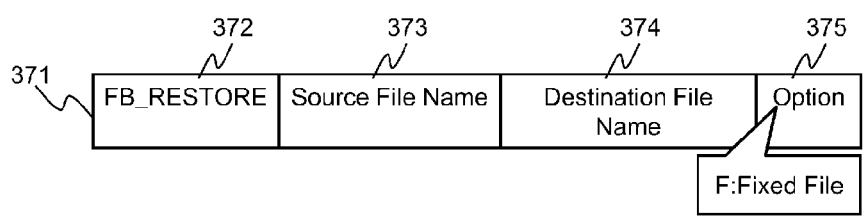
FIG. 10 is a simplified view showing one example of a command format for executing a file restore program for realizing the method for faster restoring files according to the present invention.

FIG. 10 shows a format of command 371 for starting a file restore program 370 for realizing a method for faster restoration of a large-capacity file according to the present invention. The command 371 is composed of a field 372 showing the command for executing the file restore program 370, a field 373 designating the file name of the restore source, a field 374 designating the file name of the restore destination, and a field 375 for designating options for executing commands. In the present example, F is designated in the option-designating field 375 indicating that a file having a fixed size is to be restored, but the example is not restricted thereto.

Figure 11:
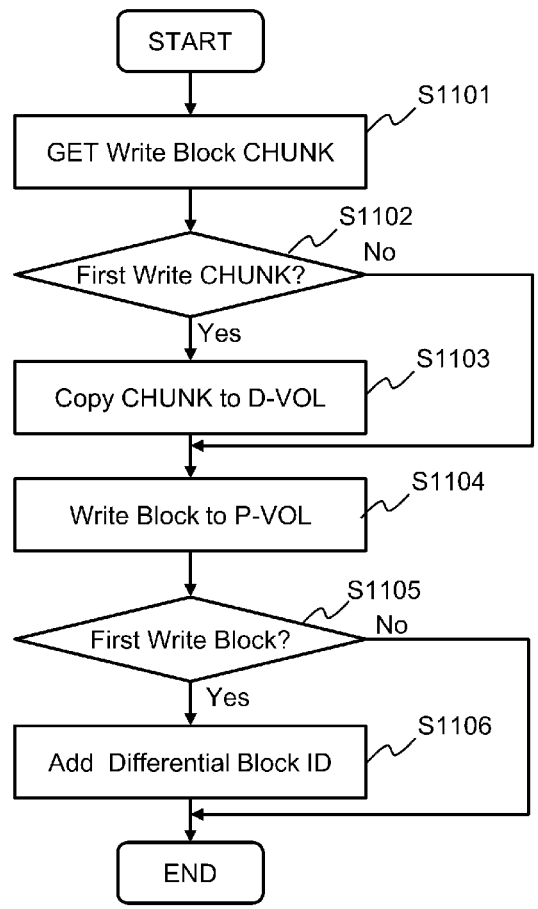
FIG. 11 is a view showing a CoW processing flow of a snapshot program.

Next, with reference to FIG. 11, a CoW processing of the snapshot program 330 according to the present embodiment will be described. The present flow of processes is executed when a write request is received from the file system program 340 to the logical volume. The steps S1101 through S1106 constituting the present process flow are performed by the snapshot program 330. At first, in step S1101, the number of the chunk of the primary volume 120 including the block being the target of the write request is acquired. In step S1102, whether the chunk of the acquired number is saved in the differential volume 130 or not is confirmed by referring to the most recent entry of the differential map table 390. As a result of S1102, if the chunk is not yet saved in the differential volume 130 (Yes), then in step S1103, the chunk of the primary volume 120 is copied to the vacant chunk of the differential volume 130, and the copy destination chunk number is entered to the differential map table 390. This copying process to the differential volume 130 is executed by the logical volume management program 320. As a result of S1102, if the chunk is already saved in the differential volume 130 (No), or after the process of S1103 has been performed, in step S1104, the writing of data related to the write request is requested to the logical volume management program 320, and the logical volume management program 320 executes the writing of data to the primary volume 120 of the storage system 100 via the storage communication program 310. Next, in S1105, regarding the data block of the primary volume 120 written in S1104, the recording status to the differential block table 400 is confirmed. As a result of S1105, if the information is not entered to the differential block table 400 (Yes), then in S1106, the information is entered to the differential block table 400 and the process is ended. As a result of S1105, if the information is already entered to the differential block table 400 (No), the process is ended as it is. As described, according to the present process, the differential map table 390 and the differential block table 400 are created while executing chunk-unit CoW processing of a CoW snapshot. It is also possible to execute CoW processing via data block units, but in that case, information in field 392 of the differential map table 390 is required for all data blocks of the primary volume 120 constituting the file system. Therefore, the size of the differential map table 390 is increased compared to the file system size, and a large amount of memory 305 is consumed compared to performing processing via chunk units. Even further, since the save processing via CoW processing occurs for each data block, the deterioration of write performance of the file system occurs more frequently compared to performing processing via chunk units. For example, if a chunk is composed of ten data blocks, the CoW processing performed via chunk units can have the size of the differential map table 390 suppressed to approximately ¹/₁₀ compared to performing CoW processing via data block units. Further, when a single data block is updated, after performing saving via CoW processing, if a write operation occurs to the non-updated 9 data blocks constituting the chunk, CoW processing will not occur, and the number of times of deterioration of write performance via CoW processing can be suppressed to ¹/₁₀ at maximum.

Next, with reference to FIGS. 12, 13 and 14, the process for restoring a file via the file restore program 370 will be described.

Figure 12:
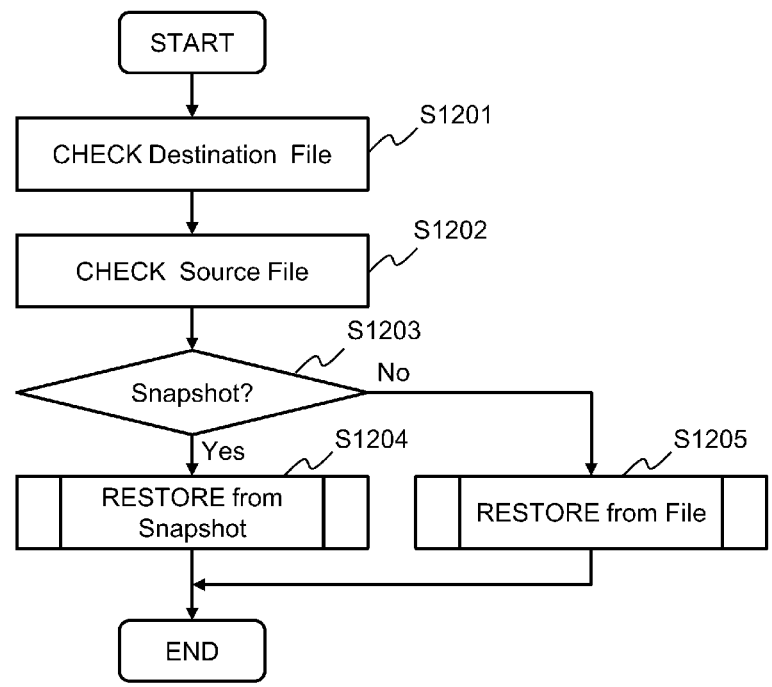
FIG. 12 is a view showing a process flow of a file restore program.

FIG. 12 is a process flow of file restoration via the file restore program 370. The file restore program 370 performs the following respective steps S1201 through S1205. At first, in S1201, the program confirms the file system name included in the restore destination file 374 designated in the command 371, and in S1202, the file system name storing the restore source file 373 designated by command 371 is confirmed. Next, in S1203, the program confirms whether the restore source file is a snapshot of the restore destination file. Actually, the system refers to the volume map table 380, and confirms whether the logical volume corresponding to the file system having the file system name confirmed in S1202 is a virtual volume 140 of the logical volume corresponding to the file system having the file system name confirmed in S1201. Further, the program confirms that the file names excluding the file system name included in each file name correspond, and if the file names do not correspond, the file will not be handled as a snapshot.

As a result of S1203, if the file is a snapshot (Yes), restore processing from the snapshot will be executed in S1204, and if the file is not a snapshot (No), restore processing from a file is executed in S1205, and the restore processing is ended. The details of the processes of S1204 and S1205 will be described with reference to FIGS. 13 and 14.

Figure 13:
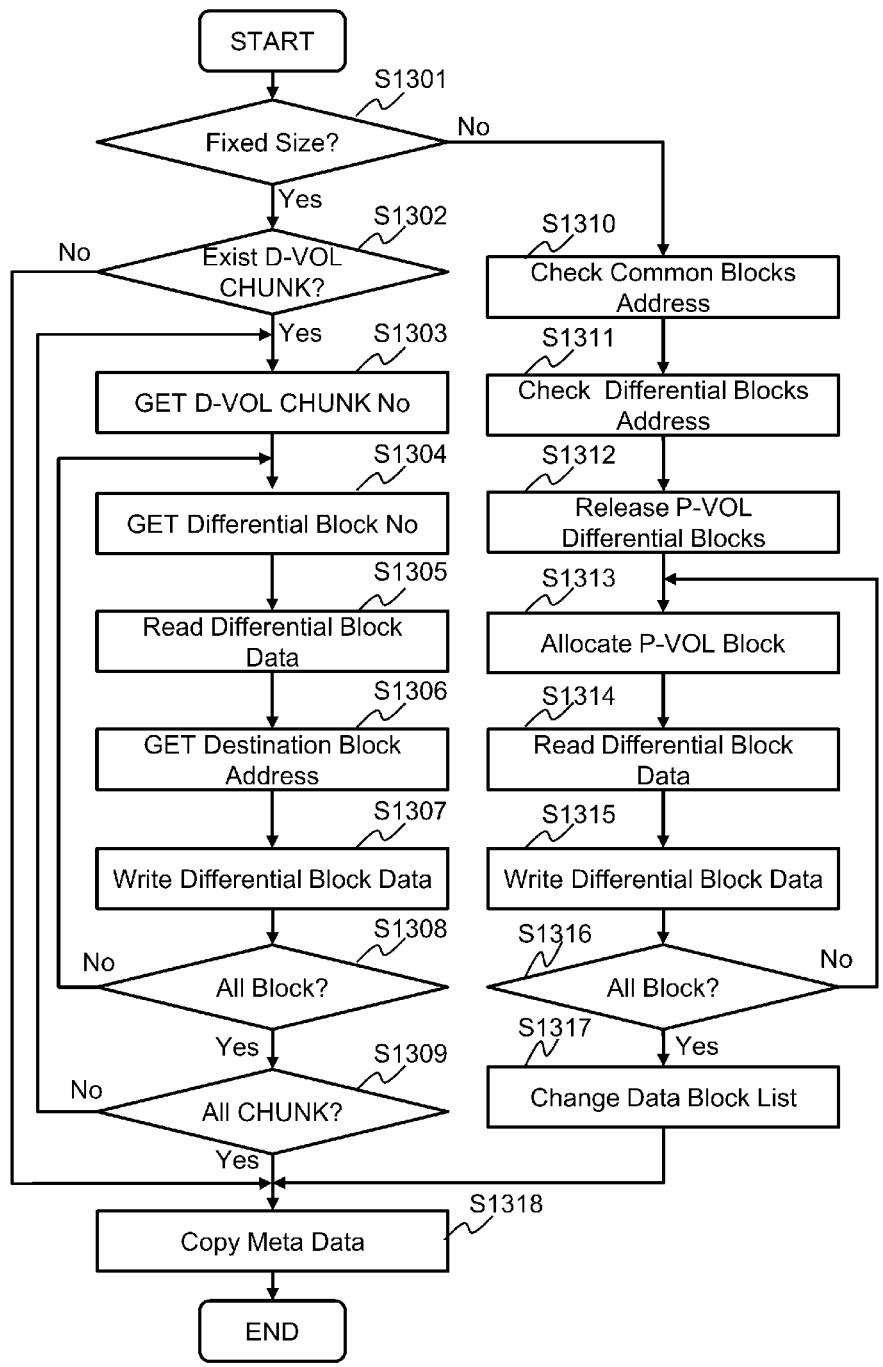
FIG. 13 is a view showing a process flow for the file restore program to restore a file from a snapshot.

FIG. 13 is a flow of the restore processing from a snapshot performed in S1204 of FIG. 12. The file restore program 370 processes the respective steps S1301 through S1318 corresponding to this restore processing from the snapshot. In S1301, the program confirms whether the file has a fixed size or not based on whether "F" is designated in option 375 of command 371, wherein if the file has a fixed size (Yes), the procedure advances to S1302, and if the file does not have a fixed size (No), the procedure advances to S1310.

In S1302, the program confirms all chunks of the differential volume 130 including the block data constituting the restore source file. Actually, the program acquires an entry of the volume map table 380 corresponding to the file system name included in the restore source file, and confirms the virtual volume 140 of the file system storing the file. Thereafter, the addresses in the virtual volume 140 of the whole data blocks constituting the restore source file are confirmed, and the chunk number within the virtual volume 140 is computed by dividing the respective addresses by the data block size and the number of data blocks constituting the chunk. Next, the program refers to the differential map table 390, and confirms whether the computed chunk is a chunk belonging to the differential volume 130. As a result of S1302, if there is a chunk included in the differential volume 130 (Yes), the procedure advances to S1303, and if not (No), that is, if the file has been updated after creation of a snapshot and the file no longer exists, the process is ended.

In S1303, one of the chunk numbers of the chunks confirmed in S1302 is acquired, and in S1304, the entry of the differential block table 400 corresponding to the chunk number acquired in S1303 is confirmed so as to acquire a single block number corresponding to the block data constituting the restore source file. Next, in S1305, the block data corresponding to the block number acquired in S1304 is read from the differential volume 130.

Next, in S1306, an address of the block of a restore destination file corresponding to the block acquired in S1304 is acquired. Actually, the program refers to the differential map table 390, specifies the chunk in the primary volume 120 corresponding to the chunk having the number acquired in S1303, and acquires a block address corresponding to the block number acquired in S1304 of the specified chunk. Thereafter, in S1307, the data read in S1305 is written to the block of the address acquired in S1306.

Next, in S1308, the program confirms whether the processing to all data blocks constituting the restore source file including all the blocks including the chunks acquired in S1303 has been completed. As a result of S1308, if the process has not been completed (No), the procedure returns to S1304, and processing is performed targeting the next data block. As a result of S1308, if the process has been completed (Yes), the procedure advances to S1309, and the program confirms whether the processing of all chunks confirmed in S1302 have been completed or not. As a result, if the process has not been completed (No), the procedure returns to S1303, where processing is performed to the next chunk, whereas if the process has been completed (Yes), the metadata of the restore source file is copied to the metadata of the restore destination file in S1318, and the process is ended.

Next, as a result of S1301, the restore processing performed in the case where the file does not have a fixed size will be described with reference to steps S1310 through S1317. Since the file does not have a fixed size, the file size is variable, and the file size may vary by updating the file after acquiring a snapshot. In other words, the number of data blocks constituting the restore source file which is the file used for acquiring the snapshot and the number of data blocks constituting the restore destination file which is the file in the file system for restoration may differ. Thus, it is necessary to add or delete data blocks to or from the restore destination file during restoration. Further, even if the same data blocks are used, the reference order of data blocks may differ between the restore source file and the restore destination file, so that the reference order of all data blocks of the restore destination file must be matched with that of the restore source file. If the file does not have a fixed size, restoration is executed considering the above-illustrated contents. At first, in S1310, the data blocks constituting the restore source file and the data blocks constituting the restore destination file are compared, and the common block addresses are confirmed. Next, in S1311, the program confirms the data blocks other than the blocks confirmed in S1310 for both the restore source file and the restore destination file. This step corresponds to confirming different block (hereinafter referred to as "differential blocks") in the data blocks constituting the restore source file and the data blocks constituting the restore destination file. Then, in S1312, the allocation of differential blocks of the restore destination file is cancelled within the differential blocks executed in S1311. Next, in S1313, the data blocks of the primary volume 120 as restore destination of differential blocks of the restore source file extracted in S1311 is allocated to the restore destination file, and in S1315, the data in the data blocks of the restore source file extracted in S1311 is written into the data blocks allocated in S1314. Thereafter, in S1316, whether the processes of S1313 and thereafter have been completed for all the data blocks of the restore source file extracted in S1311 have been completed will be confirmed, wherein if the processes are not completed (No), step S1313 is performed to the next data block, and if the processes are completed (Yes), the procedure advances to S1317. In S1317, the order of the data block list of the restore destination file is changed so that the allocation within the restore source file and the data correspond. Thereafter in S1318, the metadata of the restore source file is copied to the metadata of the restore destination file, and the process is ended.

By the process illustrated above, during restoration from a file included in a snapshot, it becomes possible to restore only the block data having been changed, so that the speed of restoration of a large capacity file can be enhanced and the restore time can be significantly shortened. Further, when restoring data from a most recent snapshot, since CoW processing does not occur, the speed of restore processing can be further enhanced and the consumption of capacity of the differential volume 130 can further be suppressed.

Figure 14:
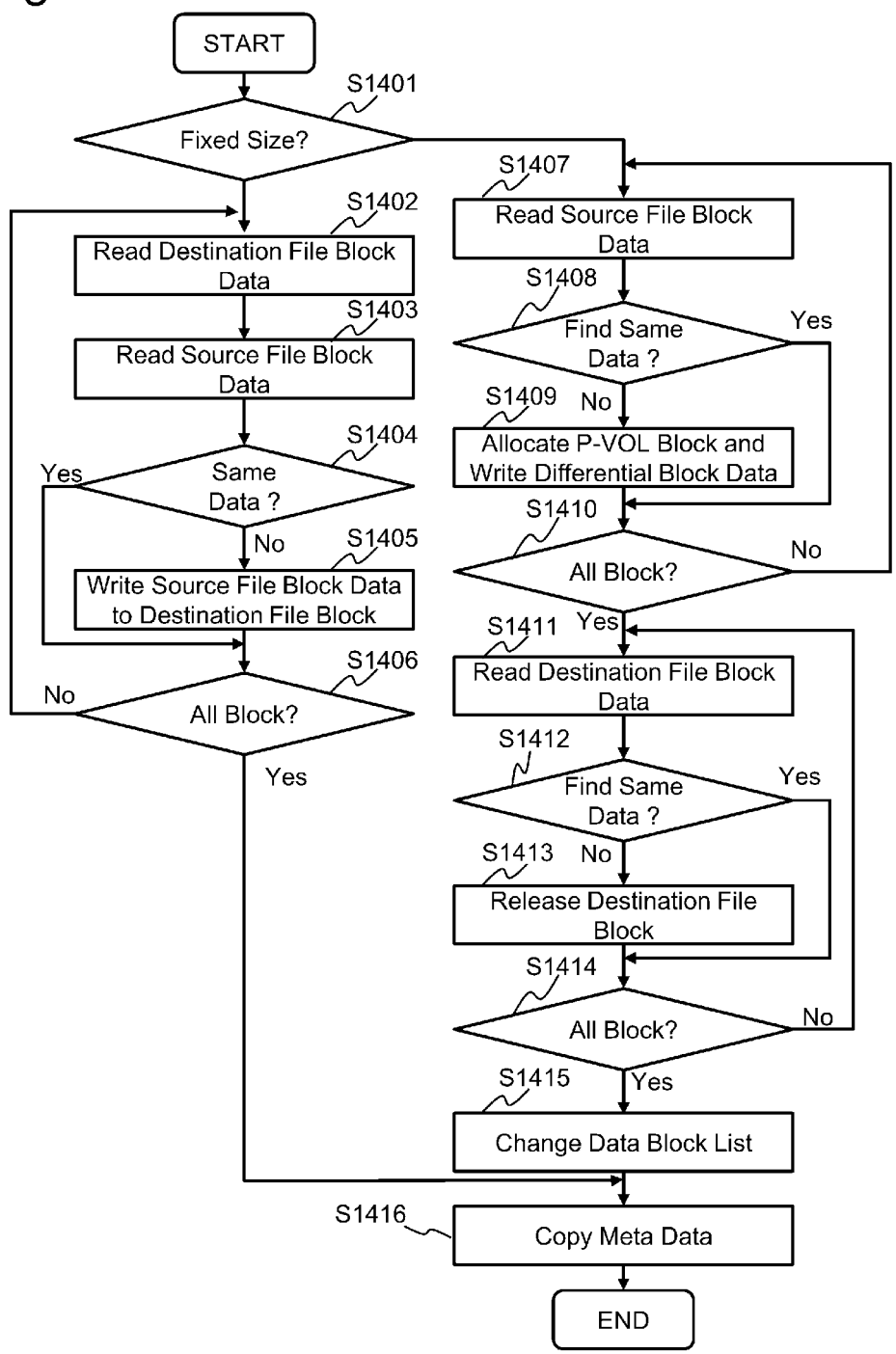
FIG. 14 is a view showing a process flow of the file restore program to restore a file from outside the snapshot.

FIG. 14 is a process flow of restoration from a file performed in S1205 of FIG. 12. The file restore program 370 performs the respective steps of S1401 through S1416 related to restoration from the file. At first in S1401, the program confirms whether the file has a fixed size or not based on whether "F" is designated in the option 375 of the command 371 or not.

As a result of S1401, if the file has a fixed size (Yes), the program reads a single block of block data from the restore destination file in S1402 and a single block of block data from the restore source file in S1403, and confirms whether the blocks store the same data or not in S1404. As a result of S1404, if the data are the same (Yes), the procedure advances to S1406, and if the data are different (No), the block data of the restore source file read in S1403 is overwritten to the block of the restore destination file read in S1402, then the procedure advance to S1406. In S1406, the program confirms whether the processing has been completed for all the data blocks constituting the file, wherein if the processing has not been completed (No), the procedure returns to S1402, and if the processing has been completed (Yes), the procedure copies the metadata of the restore source file to the metadata of the restore destination file in S1416, and ends the process.

If the file size is not a fixed size as a result of S1401 (No), in S1407, the program reads a single block of the data block of the restore source file, and in S1408, the program confirms whether the data block that stores corresponding data as the data block read in S1407 is included in the restore destination file or not. If a data block is included in a restore destination file (Yes) in S1408, the procedure advances to S1410, wherein if such data block is not included in the file (No), the data block of the primary volume 120 is allocated to the restore destination file in S1409, then the block data read in S1407 is written to the allocated data block, and the procedure advances to S1410.

In S1410, the program confirms whether the steps starting from S1407 has been executed for all data blocks constituting the restore source file, wherein if there is a data block not subjected to processing (No), the procedure returns to S1407, and if all data blocks have been subjected to processing (Yes), the procedure advances to S1411.

In S1411, a single block of the data block of the restore destination file is read. Thereafter, in S1412, the program confirms whether a data block storing data corresponding to the block data read in S1411 is included in the restore source file or not. As a result of S1411, if the data block is included in the restore source file (Yes), the procedure advances to S1414, and if not (No), the allocation of the data block read in S411 is released from the restore destination file in S1413, and the procedure advances to S1414.

In S1414, the program confirms whether the steps starting from S1411 have been performed for all the data blocks constituting the restore destination file or not, wherein if there is a data block not subjected to processing (No), the procedure returns to S1411, and if all the data blocks have been subjected to processing (Yes), the procedure advances to S1415. In S1415, the order of the file block list of the restore destination file is changed so that the order of the restore source file and data correspond. Thereafter, in S1416, the metadata of the restore source file is copied to the metadata of the restore destination file, and the process is ended.

According to the above processing, it becomes possible to restore only the data blocks having different data of the restore source file and the restore destination file during restoration from a backup file or the like, and the speed of restore processing can be enhanced.

According to the present embodiment, when the file stored in file system sharing is restored from the file of a snapshot 140 corresponding to the primary volume 120 constituting the file system sharing, the data blocks storing different data between the restore source file and the restore destination file are specified based on the differential map table 390 and the differential block table 400, and if the file size is not fixed, the order of the data blocks of the restore destination file is set to correspond to the restore source file. Further, if data is restored from a file other than the snapshot, such as from a backup file, data blocks constituting the restore source file and the data blocks constituting the restore destination file are compared, and only the data blocks storing different data are restored, whereas if the file size is not fixed, the order of the data blocks of the restore destination file is set to correspond to the restore source file.

As described, upon restoring files, it becomes possible to suppress to a minimum the data blocks to be restored, so that even if the file has a large capacity, the restoration can be performed speedily, and the restore time can be shortened significantly. Furthermore, since CoW processing will not occur during restoration from a most recent snapshot, the speed of restoration can be enhanced and the consumption of the differential volume can be suppressed.

REFERENCE SIGNS LIST

1: Network
100: Storage system
101, 201, 301: Internal Bus
102: Hard Disk
110: Storage Controller
120: Primary Volume
130: Differential volume
140: Virtual Volume
200: NAS client
202, 302: CPU
203, 303: Network Interface
204, 305: Memory
205: NFS/CIFS Client Program
206, 360: Network Communication Control Program
300: NAS device
304: Storage Interface
310: Storage Communication Control Program
320: Logical Volume Management Program
330: Snapshot Program
340: File System Program
350: NFS/CIFS Server Program
370: File Restore Program
380: Volume Map Table
390: Differential Map Table
400: Differential Block Table

The invention claimed is:

1. A restore method executed in a computer system having a file server and a storage system, wherein the storage system provides a first logical volume and a second logical volume to the file server; and
the method performed by the file server comprises:
a first step for saving data stored in a chunk composed of multiple successive blocks including a write destination block to the second logical volume upon writing data to the first logical volume, thereby writing data to the first logical volume constituting a file system sharing;
a second step for managing blocks in which the first logical volume stores write data for each chunk;
a third step for specifying the block having data written to the first logical volume out of the chunks being a restore target, wherein when restoring a file stored in the file system sharing so as to restore the first logical volume, the third step further includes specifying a block that differs from the block constituting a restore destination file out of blocks constituting a restore source file from a chunk saved in the second logical volume; and
a fourth step for copying the saved data stored in the specified block to the first logical volume,
wherein if the restore destination file does not have a fixed size, the third and fourth steps:
specify a block that differs from a block constituting the restore source file out of the blocks constituting the restore destination file;
cancel the allocation of the specified block from the restore destination file;
newly allocate to the restore destination file a number of blocks of the first logical volume corresponding to the number of blocks constituting the restore source file and that differs from the blocks constituting the restore destination file; and
restore the blocks constituting the restore source file to the newly allocated data blocks.

2. The restore method according to claim 1, wherein if the restore destination file has a fixed size, setting a location of a block of the restore destination file for copying the specified block to a same location as the restore source file.

3. The restore method according to claim 1, further comprising a fifth step for changing the order for handling blocks of the restore destination file to correspond to that of the restore source file, after restoration of all blocks is completed.

4. A computer system comprising a file server and a storage system:
wherein the storage system provides a first logical volume and a second logical volume to the file server, wherein the first logical volume constitutes a file system sharing; and
the file server is configured to:
save data stored in a chunk composed of multiple successive blocks including a write destination block to the second logical volume upon writing data to the first logical volume;
manage blocks in which the first logical volume stores write data for each chunk;
specify the block having data written to the first logical volume out of the chunks being a restore target; and
copy the saved data stored in the specified block to the first logical volume, to thereby restore the first logical volume;
the file server comprises:
a table for managing blocks to which the first logical volume stores write data for each chunk;
a snapshot processing unit for providing a snapshot composed of the data saved in the second logical volume and data of the first logical volume not saved in the second logical volume based on the table; and
a restore processing unit for restoring the file stored in the file system sharing using a file included in the snapshot;
wherein if the restore destination file does not have a fixed size, the restore processing unit is configured to:
specify a block that differs from a block constituting a file included in the snapshot being the restore source from the blocks constituting the restore destination file;
cancel the allocation of the specified block from the restore destination file; and
newly allocate to the restore destination file a number of blocks of the first logical volume corresponding to the number of blocks constituting the restore source file and that differs from the blocks constituting the restore destination file, so as to restore the blocks constituting the restore source file to the newly allocated blocks.

5. The computer system according to claim 4, wherein the restore processing unit is configured to set a location of a block of the restore destination file for restoring the specified block to a same location as the file included in the snapshot being the restore source, if the restore destination file has a fixed size.

6. The computer system according to claim 4, wherein the restore processing unit is configured to change the order for handling blocks of the restore destination file to correspond to that of the restore source file, after restoration of all blocks is completed.

* * * * *